(12) United States Patent
Kjellström et al.

(10) Patent No.: US 9,150,242 B2
(45) Date of Patent: Oct. 6, 2015

(54) ARRANGEMENT FOR A STEERING COLUMN OF A VEHICLE

(71) Applicant: Fuji Autotech AB, Eskilstuna (SE)

(72) Inventors: Niklas Kjellström, Eskilstuna (SE); Thomas Paulsson, Skogstorp (SE); Ulf Eriksson, Eskilstuna (SE)

(73) Assignee: Fuji Autotech AB, Eskilstuna (SE)

( * ) Notice: Subject to any disclaimer, the term of this patent is extended or adjusted under 35 U.S.C. 154(b) by 0 days.

(21) Appl. No.: 14/380,338

(22) PCT Filed: Feb. 13, 2013

(86) PCT No.: PCT/SE2013/050124
§ 371 (c)(1),
(2) Date: Aug. 21, 2014

(87) PCT Pub. No.: WO2013/126004
PCT Pub. Date: Aug. 29, 2013

(65) Prior Publication Data
US 2015/0007682 A1    Jan. 8, 2015

(30) Foreign Application Priority Data

Feb. 22, 2012   (SE) .................................. 1250157

(51) Int. Cl.
*B62D 1/183*    (2006.01)
*B62D 1/184*    (2006.01)
*B62D 1/187*    (2006.01)

(52) U.S. Cl.
CPC ............... *B62D 1/187* (2013.01); *B62D 1/183* (2013.01)

(58) Field of Classification Search
CPC ........ B62D 1/181; B62D 1/183; B62D 1/184; B62D 1/187
USPC ..................... 74/493, 495; 280/775
See application file for complete search history.

(56) References Cited

U.S. PATENT DOCUMENTS

| 3,299,733 | A |   | 1/1967  | Felts et al.                |
|-----------|---|---|---------|-----------------------------|
| 3,302,478 | A | * | 2/1967  | Pauwels ............ 74/493  |
| 3,355,962 | A | * | 12/1967 | Gerdes et al. ....... 74/493 |
| 3,382,944 | A | * | 5/1968  | Zeigler et al. ..... 180/286 |
| 3,421,385 | A | * | 1/1969  | Sippel ............. 74/493  |
| 4,279,176 | A | * | 7/1981  | Minamitani ........ 74/493   |
| 4,300,407 | A | * | 11/1981 | Kopf .............. 74/493   |
| 4,335,625 | A | * | 6/1982  | Nishikawa ......... 74/493   |
| 4,422,346 | A | * | 12/1983 | Nishikawa ......... 74/493   |
| 4,463,626 | A |   | 8/1984  | Kazaoka et al.              |

(Continued)

FOREIGN PATENT DOCUMENTS

| EP | 1 048 547 A2 | 11/2000 |
|----|--------------|---------|
| EP | 1 886 896 A1 | 2/2008  |

(Continued)

*Primary Examiner* — Laura Freedman
(74) *Attorney, Agent, or Firm* — Dickstein Shapiro LLP (57) ABSTRACT

A steering column arrangement for a motor vehicle. The arrangement comprises a main bracket which is to be attached to the motor vehicle, and a steering column with a steering shaft. The steering column is rotatable in relation to the main bracket between a driving position and a parking position. The arrangement also comprises a driving adjustment bracket which is rotatable in relation to the main bracket and in relation to the steering column. The steering column is lockable in different positions in the driving position, and may be locked in the parking position.

19 Claims, 6 Drawing Sheets

(56) References Cited

U.S. PATENT DOCUMENTS

| | | | |
|---|---|---|---|
| 4,530,254 A * | 7/1985 | Toyoda et al. | 74/493 |
| 4,607,540 A | 8/1986 | Kinoshita et al. | |
| 4,674,769 A * | 6/1987 | Ota et al. | 280/775 |
| 4,750,379 A * | 6/1988 | Nishikawa et al. | 74/493 |
| 4,752,085 A * | 6/1988 | Yamamoto | 280/775 |
| 4,819,498 A * | 4/1989 | Nishikawa et al. | 74/493 |
| 4,892,330 A * | 1/1990 | Beauch | 280/775 |
| 4,938,093 A * | 7/1990 | Matsumoto et al. | 74/493 |
| 4,958,852 A * | 9/1990 | Kohno et al. | 280/775 |
| 5,088,766 A * | 2/1992 | Nakatsuka et al. | 280/775 |
| 5,168,768 A | 12/1992 | Easton | |
| 5,613,404 A * | 3/1997 | Lykken et al. | 74/493 |
| 5,890,397 A * | 4/1999 | Stoner et al. | 74/493 |
| 6,363,810 B2 * | 4/2002 | Danielsson | 74/493 |
| 6,604,439 B2 * | 8/2003 | Gaukel | 74/493 |
| 7,090,250 B2 * | 8/2006 | Kinoshita et al. | 280/775 |
| 8,726,757 B2 * | 5/2014 | Barroso | 74/493 |
| 8,899,129 B2 * | 12/2014 | Isaka et al. | 74/493 |
| 8,919,816 B2 * | 12/2014 | Marutani et al. | 280/775 |
| 2001/0042420 A1 | 11/2001 | Danielsson | |
| 2002/0020245 A1 | 2/2002 | Gaukel | |

FOREIGN PATENT DOCUMENTS

| | | |
|---|---|---|
| FR | 2 909 631 A3 | 6/2008 |
| SE | 533 685 C2 | 11/2010 |
| WO | WO 2008/138731 A1 | 11/2008 |

* cited by examiner

ARRANGEMENT FOR A STEERING COLUMN OF A VEHICLE

TECHNICAL FIELD

The present invention relates to an arrangement for a steering column for a vehicle. More specifically the present invention relates to such an arrangement, which provides for a driving position and a parking position of the steering column. Furthermore, the driving position is adjustable.

DESCRIPTION OF THE PRIOR ART

Commercial vehicles are in some instances used in a manner requiring a plurality of starts and stops with only short distances travelled between the stops. Examples on such vehicles are delivery trucks and garbage trucks. In order to facilitate exit from the truck and re-entry into the truck it is favourable to be able to move the steering wheel between a parking position and a driving position without changing the adjustment in the driving position, i.e., so that the steering wheel may be returned to the same driving position from the parking position.

U.S. Pat. No. 5,168,768 describes a tilt steering column assembly in which the angle of the steering column is adjustable in relation to the vehicle. The angle of the steering column is adjustable in relation to a bracket member with a sector to adjust the angle of the steering column in the driving position. Furthermore, the bracket member is rotatable between a driving position and a parking position.

EP 1 048 547 describes a steering column assembly comprising a lower column section and an upper column section carrying a steering wheel, the two sections being articulated to one another to allow the upper section to pivot between a driving position and a retracted position. A gas strut which has an adjustable length determines the position of the steering column in the driving position. The lower end of the gas strut is releasable from the lower column section to allow the steering column to be moved to the retracted position, which is determined by an abutment against which the steering wheel comes to a stop.

WO 2008/138731 describes an arrangement for a steering column of a commercial vehicle. The arrangement comprises a bearing block which is to be attached to the vehicle. The arrangement also comprises an intermediate frame which is adjustably arranged in the bearing block. A steering column housing is arranged in the intermediate frame movable between a parking position and a driving position. The driving position is adjustable by adjusting the position and angle of the intermediate frame in relation to the bearing block.

EP 1886896 describes a steering column with easy entry and memory function, which steering column functions similarly to the one described in WO 2008/138731.

SUMMARY OF THE INVENTION

An object of the present invention is to provide a steering column arrangement in which the steering column is positionable in an adjustable driving position and a parking position and which is an alternative to the steering column arrangements of the prior art.

Another object of the present invention is to provide a steering column arrangement in which the steering column is positionable in an adjustable driving position and a parking position and in which the angle of the steering column in the parking position is independent of the angle of the steering column in the driving position.

At least one of these objects is provided with a steering column arrangement according to the present invention.

A steering column arrangement according to the invention is arranged for a motor vehicle and comprises a main bracket which is to be attached to the motor vehicle, a steering column with a steering shaft which in one end is to be connected to a steering wheel and which in the other end is to be connected to a steering system of the motor vehicle. The steering column is rotatable in relation to the main bracket between a driving position and a parking position. The arrangement comprises a driving adjustment bracket which is rotatable in relation to the main bracket and in relation to the steering column. The steering column arrangement is characterised in that the driving adjustment bracket and the steering column are rotatable around a common first rotational axis, that it comprises a driving adjustment locking system by means of which the steering column is lockable in different positions in relation to the driving adjustment bracket, and that it comprises locking means with which the position of the steering column or the driving adjustment bracket may be locked in relation to the main bracket.

With a steering column arrangement according to the invention it is possible to lock the steering column in the same angle independent of the adjustment of the steering angle. Furthermore, the steering column arrangement of the invention provides an uncomplicated arrangement for adjusting the driving position of the steering column.

The invention is primarily intended for vehicles which are used in a manner so that the driver has to exit and enter the vehicle numerous times every day. Examples on such vehicles are trucks, tractors, construction vehicles and different agricultural vehicles. In the case of the arrangement being arranged on a truck it is to be arranged in the cabin of the truck. The cabin may be tiltable in relation to the frame of the vehicle.

The steering column may be an extendable steering column comprising a lower steering column member and an upper steering column member, which are slidably connected to each other, and wherein the position of the upper steering column member is lockable in different positions in relation to the driving adjustment bracket. By having such an extendable steering column the driving position may be adjusted more precisely. The extension of the steering column is independent from the positioning in the parking position or the driving position. Thus, the steering wheel will end up at different positions along the steering column depending on the extension of the steering column. By separating the extension of the steering column from the angular adjustment the steering column arrangement becomes less complicated.

The driving adjustment locking system may comprise a first lock member with a first elongated slit which extends essentially radially from the first rotational axis. This is a solution that guides the movement along one line and corresponds to the extension of the steering column. A tap or a bolt may be arranged in the slit. The radially extending slit may be combined with a circumferentially extending slit, which corresponds to angular adjustment of the steering column. It is also possible to combine the slits into an oversized hole. A tap or bolt may be arranged in different positions in such a hole. The solution with separate slits may, however, increase the controllability of the movement of the steering column.

The first lock member may be arranged on the upper steering column member. Alternatively it may be arranged on the driving adjustment bracket. As it is their mutual position that is to be controlled it does not matter whether the first lock member is arranged on the upper steering column member or the driving adjustment bracket.

The driving adjustment locking system may comprise a second lock member with a second elongated slit which extends essentially circumferentially in relation to the rotational axis in order to provide rotational adjustment of the steering column in relation to the driving adjustment bracket. In case the steering column is not extendable the first lock member may be disposed with. A tap or bolt may be arranged in the second elongated slit. As stated above the circumferentially extending slit may be combined with a radially extending slit. It is also possible to combine the slits into an oversized hole as mentioned above. The solution with separate slits may, however, increase the controllability of the movement of the steering column.

The second lock member may be arranged either on the driving adjustment bracket or on the steering column. If present the first lock member is arranged on the other of the adjustment bracket or on the steering column.

The steering column arrangement comprises some means for locking the steering column to the driving adjustment bracket. This may be provided by means of a clamping member which is arranged through the second elongated slit in the second lock member. In case also the first lock member has a slit the clamping member extends also through the slit in the first lock member. In case the first lock member has no slit the first lock member may comprise a hole through which the clamping member is arranged of the clamping member may comprise a bolt which is part of the clamping member.

The locking means may comprise at least one movable lock member which is suspended in the main bracket and which is arranged to engage with static lock members in the driving adjustment bracket and the steering column. It is also possible to have one movable lock member for each one of the driving adjustment bracket and the steering column. In the latter case it is possible to have the lock members suspended in the driving adjustment bracket and the steering column, respectively.

In case the locking means comprise one movable lock member it may comprise one lever which in one end is arranged in the main bracket rotatable around a second rotational axis and in the other end is provided with an engagement member. Alternatively, the movable lock member may comprise, for example, a piston which is movable essentially in parallel with the first rotational axis. Also other embodiments for the movable lock member are conceivable.

The engagement member may comprise a hook and each one of the static lock members may comprise a slot. A lever with a hook in combination with a slot may be made partially self engaging by providing the lever with a spring forcing it into the slots.

The second rotational axis may be essentially parallel to the first rotational axis and each one of the static lock members may comprise a slide surface facing away from the first rotational axis in which slide surface the slots are arranged and on which the hook may slide before engaging with a slot. Slide surfaces are preferably combined with a spring loaded lever as the hook then may slide on the slide surfaces until it comes to a slot when it is forced into the slot by the spring.

The static lock members may be arranged in different positions along the first rotational axis. This allows the driving position to be freely adjustable.

If a single movable lever with a hook is used the hook has to be able to be wide enough to engage with both slots which are at different positions in the direction of the first rotational axis. A slot in one of the static lock members is not allowed to overlap the slide surface of the other static lock member for any possible mutual position as the hook then could not engage with the slots. This limits the extension of the slide surfaces. However, when the steering column is placed in the position being most far away from the parking position the limited extension of the slide surfaces may lead to a gap between the static lock members, into which gap the hook may fall down. In order to provide a continuous slide surface the steering column arrangement may comprise a slide surface member which is arranged to close the gap between the static lock members when they are moved apart.

Alternatively the driving adjustment bracket may be lockable in different positions in relation to the main bracket by means of the driving adjustment locking system. The position of the steering column may be locked in relation to the driving adjustment bracket or the main bracket with the locking means. This is an alternative to the arrangement described above.

The steering column arrangement may comprise a slidable bracket which is arranged slidable in relation to the main bracket and in relation to which slidable bracket the steering column may be locked with the locking means. To this end the locking means may comprise a first hook and the slidable bracket may comprise a rod with which the first hook may engage in the parking position. The locking means may also comprise a second hook and the driving adjustment bracket may comprise a slit with which the second hook may engage in the driving position.

The locking means are controlled electrically, manually pneumatically and/or hydraulically.

In the following preferred embodiments of the invention will be described with reference to the figures.

DESCRIPTION OF PREFERRED EMBODIMENTS OF THE INVENTION

In the following description of preferred embodiments similar features in the different figures will be denoted with the same reference numeral. It is to be noted that the figures are not necessarily drawn to scale.

Figure 1:
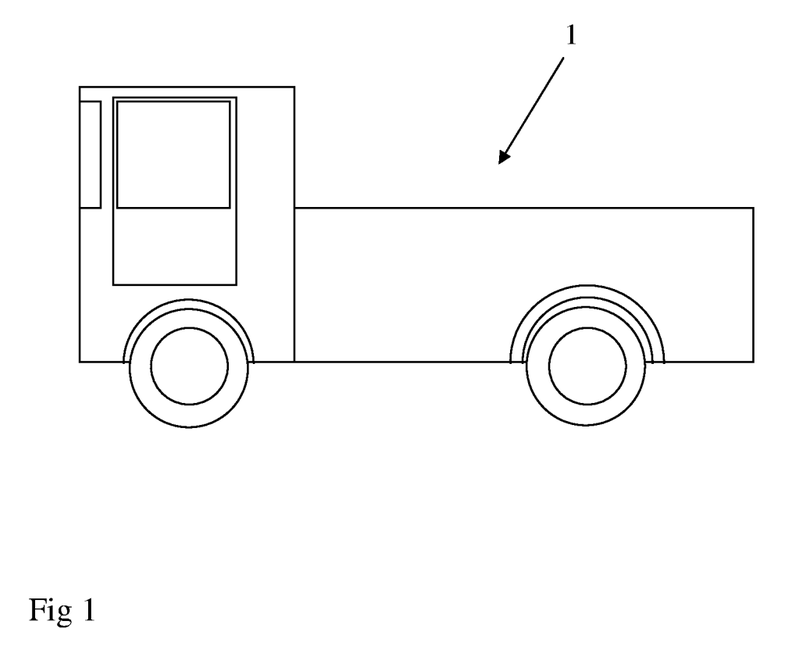
FIG. 1 shows schematically a motor vehicle comprising a steering column arrangement according to the present invention.

FIG. 1 shows schematically a motor vehicle 1 comprising a steering column arrangement according to the following description.

Figure 2:
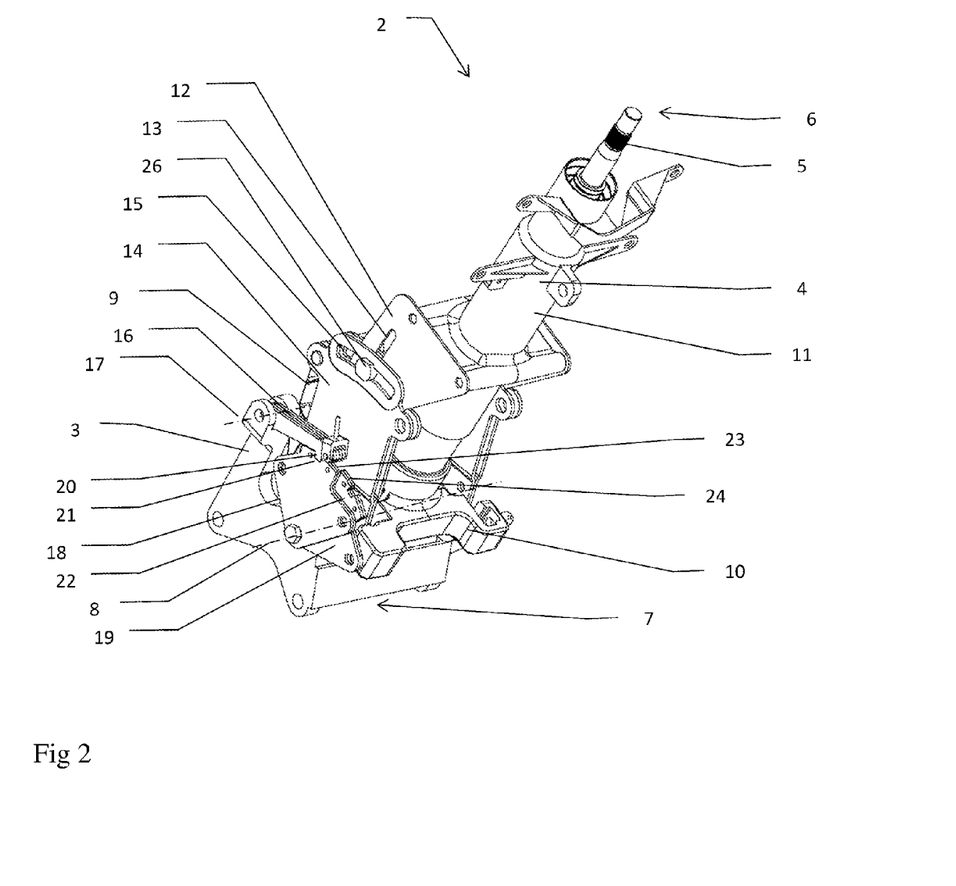
FIG. 2 shows schematically a steering column arrangement according to an embodiment of the invention.

FIG. 2 shows schematically a steering column arrangement 2 according to an embodiment of the invention. The steering column arrangement comprises a main bracket 3 which is to be attached to the motor vehicle 1. The motor vehicle 1 could be any type of motor vehicle 1. The steering column arrangement 2 of the invention is, however, primarily intended for vehicles which are to be used for tasks in which the driver has to enter and exit the vehicle a large number of times each day, such as e.g. delivery trucks, dump trucks, tractors, construction vehicles and different agricultural vehicles. In order to facilitate the entry into and exit from such trucks it is possible to implement an easy entry function to the steering wheel. Such an easy entry function allows the steering column to be moved to a parking position in which it is at a distance from the driver's seat. The steering column arrangement 2 comprises a steering column 4 with a steering shaft 5 which in one end, the upper end 6 in the figure, is to be connected to a steering wheel (not shown). In the other end 7 the steering shaft is to be connected to a steering system of the motor vehicle 1, which steering column 4 is rotatable in relation to the main bracket 3 between a driving position and a parking position around a first rotational axis 8. The steering column 4 is an extendable steering column comprising a lower steering column member 10 and an upper steering column member 11, which are slidably connected to each other.

The steering column arrangement 2 also comprises a driving adjustment bracket 9 which is rotatable around the first rotational axis 8 in relation to the main bracket 3 and in relation to the steering column 4. Thus, the driving adjustment bracket 9 and the steering column 4 are rotatable around a common axis.

The steering column arrangement also comprises a driving adjustment locking system by means of which the steering column 4 is lockable in different positions in relation to the driving adjustment bracket 9. The driving adjustment locking system comprises a first lock member 12 arranged on the upper steering column member and having a first elongated slit 13 which extends essentially radially from the first rotational axis 8. The driving adjustment locking system also comprises a second lock member 14 arranged on the driving adjustment bracket and having a second elongated slit 15 which extends essentially circumferentially in relation to the first rotational axis in order to provide rotational adjustment of the steering column 4 in relation to the driving adjustment bracket 9. A clamping member 26 is arranged through the first elongated slit 13 in the first lock member 12 and the second elongated slit 15 in the second lock member 14. By clamping together the first 12 and the second lock members 14 the driving adjustment bracket and the steering column may be locked to each other in a chosen driving position. The clamping member 26 may have different forms. The function of the clamping member 26 is to clamp together the first and second lock members. The clamp member 26 may be in the form of a bolt and nut as shown in the drawings.

The steering column arrangement 2 also comprises locking means with which the position of the steering column 4 or the driving adjustment bracket may be locked in relation to the main bracket 3. The locking means comprises a movable lock member in the form of a lever 16 which in one end is arranged in the main bracket 3 rotatable around a second rotational axis 17 and in the other end is provided with an engagement member arranged to engage with a first or a second static lock members 18, 19, in the driving adjustment bracket 9 and the steering column 4, respectively. In the shown embodiment the second rotational axis 17 is essentially parallel to the first rotational axis 8.

In the shown embodiment the engagement member comprises a hook 20 and each one of the static lock members 18, 19, comprises a slot 21, 22. The lever 16 may be controlled electrically, manually, pneumatically and/or hydraulically.

The static lock members 18, 19, comprise a slide surface 23, 24, facing away from the first rotational axis 8 in which slide surfaces 23, 24 the slots 21, 22, are arranged and on which the hook 20 may slide before engaging with a slot 21, 22. The static lock members 18, 19, are arranged in different positions along the first rotational axis 8.

Figure 3:
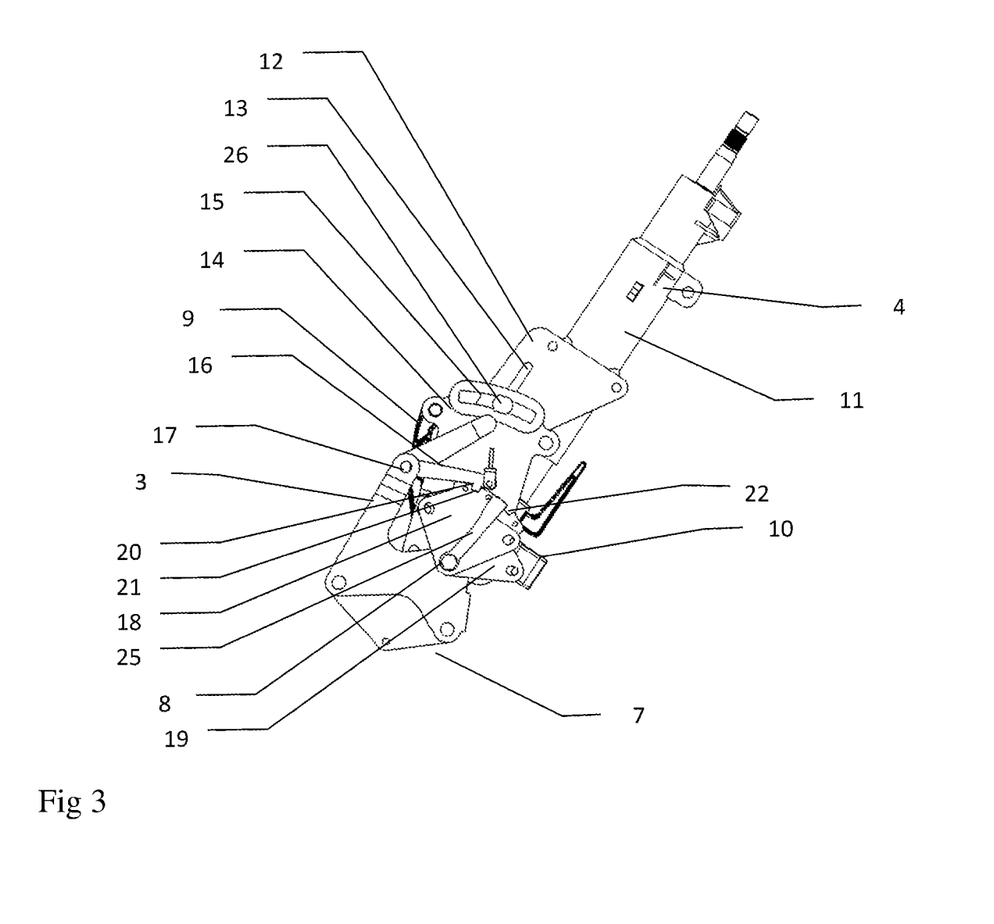
FIG. 3 is a side view of the steering column arrangement of FIG. 2.

FIG. 3 is a side view of the steering column arrangement 2 of FIG. 2 which shows the static lock members 18, 19 more clearly.

A slide surface member 25 (FIG. 3) which is arranged to close the gap between the static lock members 18, 19, when they are moved apart is also provided. Depending on the allowed angular movement of the steering column 4 in relation to the driving adjustment bracket 9 the slide surface member 25 may be disposed of.

In FIG. 3 the lever is in engagement with the first static lock member 18 which is arranged on the driving adjustment bracket 9. Thus, the position of the steering shaft 5 and the steering wheel depends on the adjustment of the driving adjustment locking system.

Figure 4A:
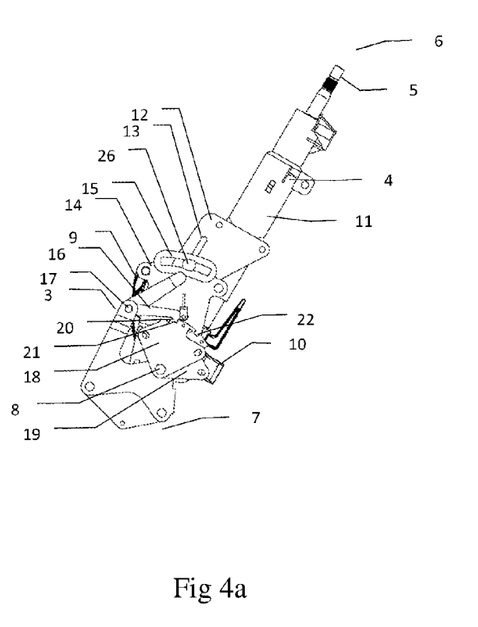
FIG. 4a-d shows the steering column arrangement in different positions.
Figure 4B:
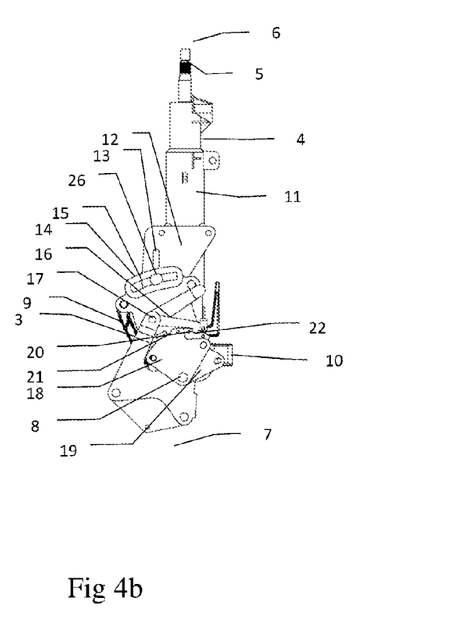
Figure 4C:
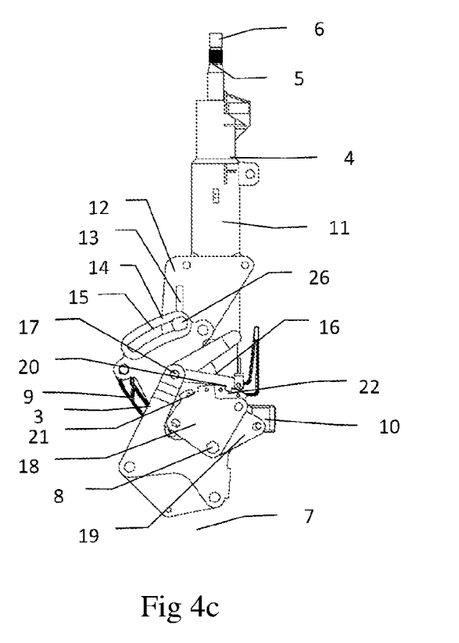
Figure 4D:
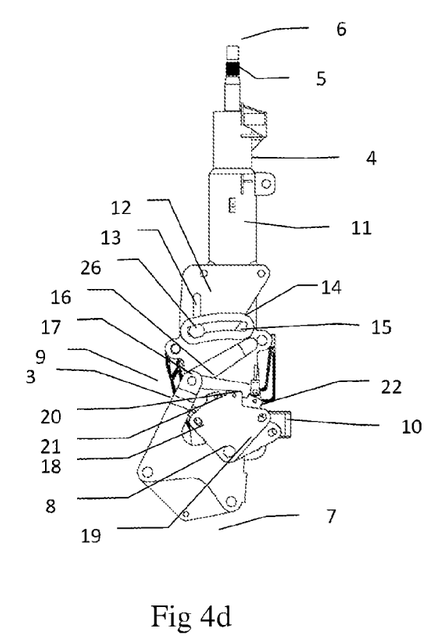

FIG. 4a-d shows the steering column arrangement 2 in different positions. FIG. 4a shows the steering column arrangement 2 in the driving position and the driving adjustment position in the middle position in the middle of the slits 13, 15. FIG. 4b shows the steering column arrangement 2 in the parking position for the same adjustment of the steering column in relation to the driving adjustment bracket 9. FIGS. 4c and 4d both show the steering column arrangement 2 in the parking position but with the driving adjustment position in the most forward and the most backward position.

As is evident from FIG. 4a-d the steering column 4 always has the same angular position in relation to the main bracket 3 when the steering column arrangement 2 is in the parking position independent of the driving adjustment position.

Figure 5A:
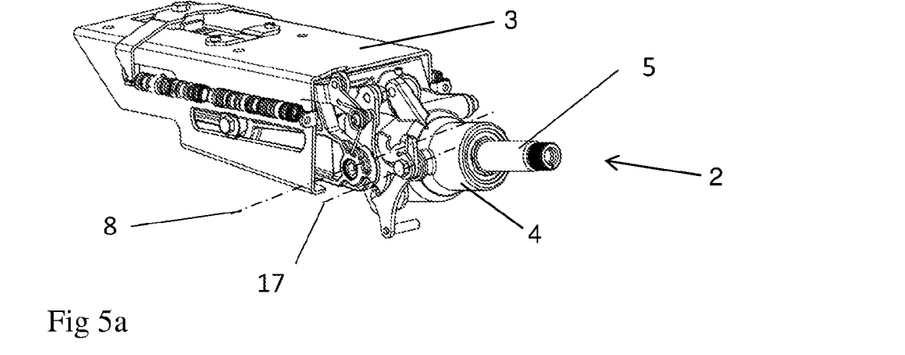
FIG. 5a-c shows a steering column arrangement according to an alternative embodiment of the present invention.
Figure 5B:
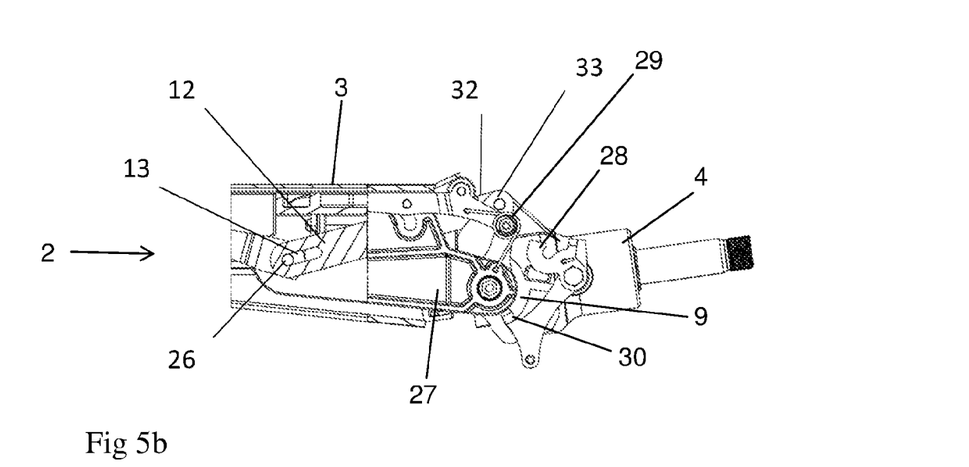
Figure 5C:
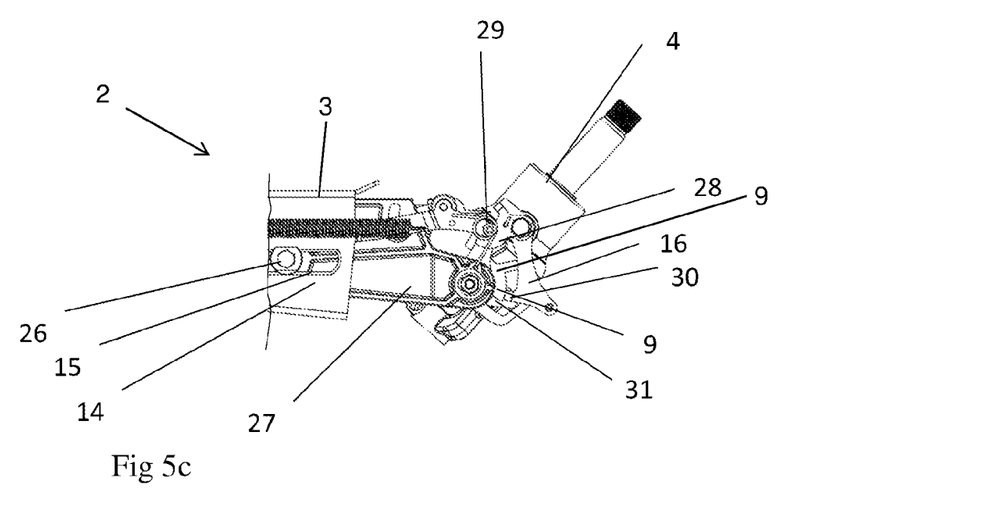

FIG. 5a-c shows a steering column arrangement according to an alternative embodiment of the present invention. The steering column arrangement 2 comprises a slidable bracket 27 which is arranged slidable in relation to the main bracket 3 and in relation to which slidable bracket 27 the steering column 4 may be locked with the locking means. The steering column 4 is arranged rotatable around the common first rotational axis 8. The locking means comprises a first hook 28 which is rotatable around a second rotational axis 17 and the slidable bracket comprises a first static lock member 29 with which the first hook 28 may engage in the parking position. The locking means also comprises a lever 16 with a second hook 30 and the driving adjustment bracket 9 comprises a second static lock member 31 in the form of a slit with which the second hook 30 may engage in the driving position. The position of the steering column 4 may thus be locked in relation to the driving adjustment bracket 9 or the slidable bracket 27 with the locking means. The driving adjustment bracket 9 is connected to an arm 32 in a first end 33 of the arm 32. The arm 12 constitutes a first lock member and comprises a first elongated slit 13 in the second end of the arm 32. The main bracket 3 defines a second lock member and comprises a second elongated slit 15. A clamping member 26 is arranged through the first elongated slit 13 in the first lock member 12 and the second elongated slit 15 in the second lock member 14. By clamping together the arm 12 and the second lock members 14 the driving adjustment bracket 9 and the steering column 4 may be locked to each other in a chosen driving position. In this way the steering column 4 is lockable in different positions in relation to the slidable bracket 27 and thus also to the main bracket 3.

The invention is not limited to the above described embodiments but may be amended in many different ways without departing from the spirit and scope of the invention which is defined by the claims.

The second rotational axis does not have to be essentially parallel to the first rotational axis. It is for example possible to have the second rotational axis perpendicular to the first rotational axis.

It is not necessary to have the movable lock member in the form of a lever 16 with a hook 20. The movable lock member could have other forms. It could for example have the form of a piston which is arranged to interact with static lock members in the form of holes.

In case the first lock member 12 does not comprise an elongated slit 13 the clamping member 26 may be a part of the first lock member 12, i.e., a part of the clamping member 26 being a tap or a bolt may be fixed in relation to the first lock member.

The invention claimed is:

1. A steering column arrangement for a motor vehicle, which arrangement comprises:
    a main bracket which is to be attached to the motor vehicle,
    a steering column with a steering shaft which at one end is to be connected to a steering wheel and which at the other end is to be connected to a steering system of the motor vehicle, which steering column is rotatable in relation to the main bracket between a driving position and a parking position,
    a driving adjustment bracket which is rotatable in relation to the main bracket and in relation to the steering column, wherein the driving adjustment bracket and the steering column are rotatable around a common first rotational axis, the steering column arrangement comprises a driving adjustment locking system by means of which the steering column is lockable in different positions in relation to the driving adjustment bracket, wherein the steering column arrangement comprises locking means with which the steering column may be locked in the driving position and the parking position, and wherein the position of the steering column may be locked in relation to the main bracket in the parking position or the driving adjustment bracket may be locked in relation to the main bracket in the driving position, whereby the position of the steering column with respect to the main bracket in the parking position is independent of the position of the steering column in relation to the driving adjustment bracket.

2. The steering column arrangement according to claim 1, wherein the steering column is an extendable steering column comprising a lower steering column member and an upper steering column member, which are slidably connected to each other, and wherein the position of the upper steering column member is lockable in different positions in relation to the driving adjustment bracket.

3. The steering column arrangement according to claim 2, wherein the driving adjustment locking system comprises a first lock member with a first elongated slit which extends essentially radially from the first rotational axis.

4. The steering column arrangement according to claim 3, wherein the first lock member is arranged on the upper steering column member.

5. The steering column arrangement according to claim 1, wherein the driving adjustment locking system comprises a second lock member with a second elongated slit which extends essentially circumferentially in relation to the first rotational axis in order to provide rotational adjustment of the steering column in relation to the driving adjustment bracket.

6. The steering column arrangement according to claim 5, wherein the second lock member is arranged on the driving adjustment bracket.

7. The steering column arrangement according to claim 5, wherein the steering column and the driving adjustment bracket are lockable to each other by means of a clamping member which is arranged through the second elongated slit in the second lock member.

8. The steering column arrangement according to claim 1, wherein the locking means comprises at least one movable lock member which is suspended in the main bracket and which is arranged to engage with static lock members in the driving adjustment bracket and the steering column.

9. The steering column arrangement according to claim 8, wherein said at least one movable lock member comprises at least one lever which in one end is arranged in the main bracket rotatable around a second rotational axis and in the other end is provided with an engagement member.

10. The steering column arrangement according to claim 9, wherein the engagement member comprises a hook and wherein each one of the static lock members comprises a slot.

11. The steering column arrangement according to claim 10, wherein the second rotational axis is essentially parallel to the first rotational axis and wherein each one of the static lock members comprise a slide surface facing away from the first rotational axis in which slide surfaces the slots are arranged and on which the hook may slide before engaging with a slot.

12. The steering column arrangement according to claim 11, wherein the static lock members are arranged in different positions along the first rotational axis.

13. The steering column arrangement according to claim 11, comprising a slide surface member which is arranged to close a gap between the static lock members when the static lock members are moved apart.

14. The steering column arrangement according to claim 1, wherein the driving adjustment bracket is lockable in different positions in relation to the main bracket by means of the driving adjustment locking system, and wherein the position of the steering column may be locked in relation to the driving adjustment bracket or the main bracket with the locking means.

15. The steering column arrangement according to claim 14, comprising a slidable bracket which is arranged slidable in relation to the main bracket and in relation to which slidable bracket the steering column may be locked with the locking means.

16. The steering column arrangement according to claim 15, wherein the locking means comprises a first hook and the slidable bracket comprises a first static lock member with which the first hook may engage in the parking position.

17. The steering column arrangement according to claim 15, wherein the locking means comprises a second hook and the driving adjustment bracket comprises a second static lock member with which the second hook may engage in the driving position.

18. The steering column arrangement according to claim 1, wherein the locking means are controlled electrically, manually, pneumatically and/or hydraulically.

19. Motor vehicle comprising a steering column arrangement according to claim 1.

* * * * *